No. 659,374. Patented Oct. 9, 1900.
A. W. MACONOCHIE.
APPARATUS FOR USE IN CONNECTING TOGETHER TINS CONTAINING PROVISIONS.
(Application filed May 24, 1900.)
(No Model.)
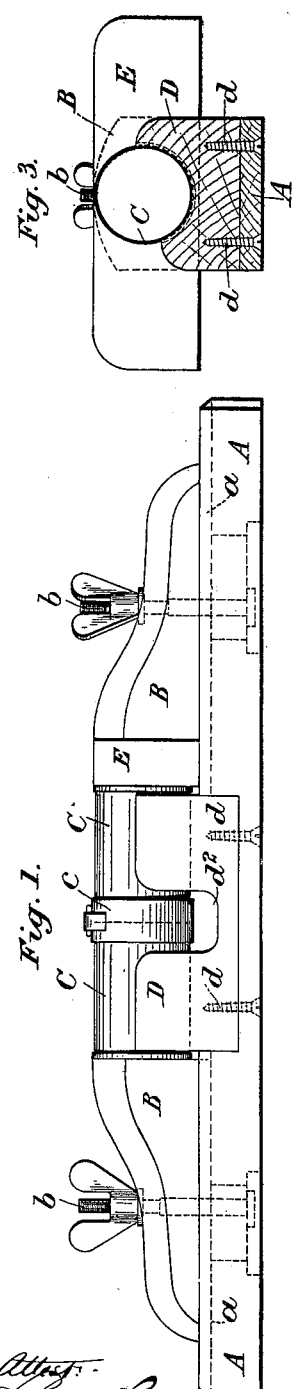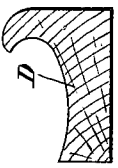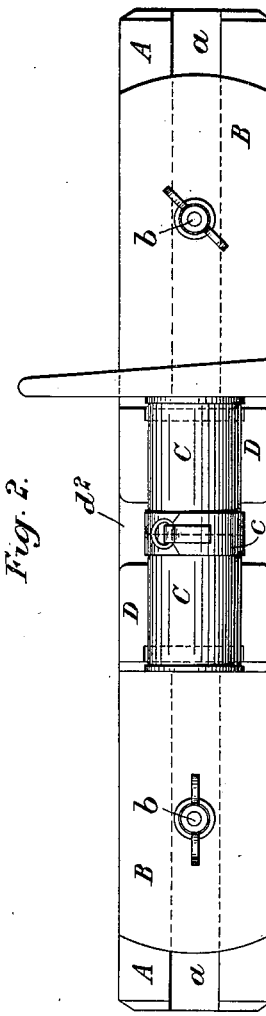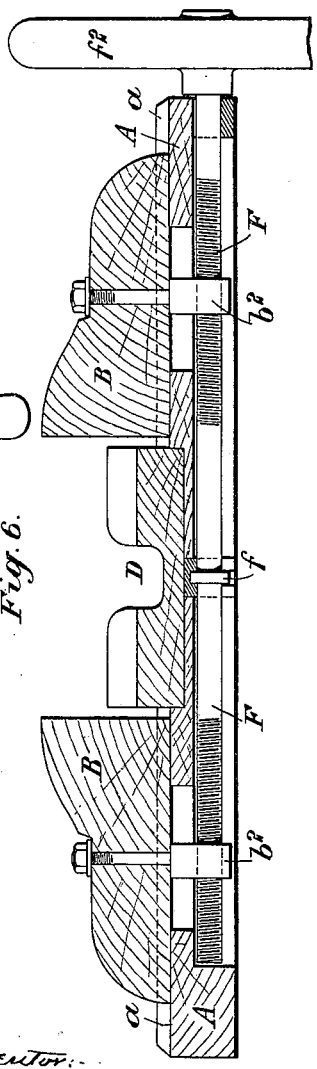

UNITED STATES PATENT OFFICE.

ARCHIBALD WHITE MACONOCHIE, OF LONDON, ENGLAND.

APPARATUS FOR USE IN CONNECTING TOGETHER TINS CONTAINING PROVISIONS.

SPECIFICATION forming part of Letters Patent No. 659,374, dated October 9, 1900.

Application filed May 24, 1900. Serial No. 17,880. (No model.)

*To all whom it may concern:*

Be it known that I, ARCHIBALD WHITE MACONOCHIE, a subject of the Queen of Great Britain and Ireland, and a resident of 131 Leadenhall street, in the city of London, England, have invented a new and useful Apparatus for Use in Connecting Together Tins Containing Provisions or the Like, (for which I have applied for a patent in Great Britain, No. 3,911, dated February 28, 1900,) which invention is fully set forth in the following specification.

In putting up provisions or the like in tins two tins each provided with a cover are sometimes joined together by soldering a metal strip thereto. The soldering of this strip is troublesome and occupies a considerable time; and it is the object of my invention to provide apparatus whereby the joining together of such tins by soldering the strip thereto is effected with great facility and expedition.

An apparatus constructed in accordance with my invention is illustrated in side elevation in Figure 1, in plan in Fig. 2, and in transverse section in Fig. 3, of the accompanying drawings. Figs. 4 and 5 show in transverse section blocks for supporting different-shaped tins. Fig. 6 is a longitudinal section of a modification in the construction of the apparatus.

The said apparatus comprises a base A, provided with adjustable heads B, capable of sliding in guideways $a$ in the base A and fixable in position by screws $b$. Between these heads the tins C to be joined are clamped in position, with their adjacent ends in contact, while the strip (indicated at $c$) is soldered around the sides of the tins at the said adjacent ends. The tins while being connected are supported by a block D, attached to the base A between the clamping-heads B, and this block may be removable by attaching it to the base by screws $d$, as shown, for example, so that a block of a shape to fit the cylindrical, oval, or other form of tins operated upon may be put in place. The block shown in Figs. 1, 2, and 3 is shaped to receive cylindrical tins, that shown in Fig. 4 is shaped to receive oval tins, and that shown in Fig. 5 is shaped to receive square tins. There is a recess in the block at $d^2$ to accommodate the strip $c$ and give ready access to the tins and strip in soldering. When the soldering has been effected at one part of the tins and strip, they are moved around to present before the operator the remaining portion or portions of the tins and strip requiring to be soldered together. To allow of thus moving the tins and strip, a wedge E is interposed between the outward end of one of the tins and the adjacent head B, so that by slackening the said wedge the tins C can be turned to bring the remaining portion or portions thereof and of the strip $c$ before the operator, the said wedge being pressed in again to clamp the tins while soldering is being done.

It will be readily understood that the invention is not limited to the precise details hereinbefore described and illustrated. For example, one of the heads may be made as a fixture and the other only be adjustable, and the block D may be replaced by two separate blocks on either side of a space answering to the recess $d^2$.

In Fig. 6 I have shown a modification in which the heads B are provided with screw-nuts $b^2$ and the base A is provided with a screw-rod F, prevented by the arrangement at $f$ from moving longitudinally, the screws on which rod are right and left handed, the said nuts being correspondingly screw-threaded and engaging respectively with the said screws on the rod F, which rod is provided with a handle or hand-wheel $f^2$. By rotating the rod in one direction the heads move toward each other and grip the tins between them, and when the said tins are to be released to turn them around for soldering the remaining portion or portions this is effected by moving the handle or hand-wheel $f^2$ in the reverse direction. If desired, in this arrangement also one of the heads only may be movable by means of a screw, the other head being fixed.

Having now particularly described and ascertained the nature of my said invention and in what manner the same is to be performed, I declare that what I claim is—

1. An apparatus for use in connecting together tins containing provisions or the like, the said apparatus consisting of a base, two heads mounted on the base, means for moving one of said heads toward the other to grip the tins, and a support on which the tins rest between the heads and which will permit the tins to be turned to different positions during soldering.

2. An apparatus for use in connecting together tins containing provisions or the like, the said apparatus consisting of a base, two heads mounted on the base, means for moving one of said heads toward the other to grip the tins, and a support on which the tins rest between the heads and which will permit the tins to be turned to different positions during soldering, said support having a recess or space over which the joint between the cans rests to give access to the latter in soldering.

In testimony whereof I have signed this specification in the presence of two subscribing witnesses.

ARCHIBALD WHITE MACONOCHIE.

Witnesses:
 WILLIAM FREDERICK UPTON,
 JOHN EDWARD NEWTON.